United States Patent
Mittermayer et al.

(10) Patent No.: US 6,222,933 B1
(45) Date of Patent: Apr. 24, 2001

(54) METHOD OF PROCESSING SPOTLIGHT SAR RAW DATA

(75) Inventors: Josef Mittermayer, München; Alberto Moreira, Garching, both of (DE)

(73) Assignee: Deutsches Zentrum für Luft-und Raumfahrt e.v., Bonn (DE)

( * ) Notice: Subject to any disclaimer, the term of this patent is extended or adjusted under 35 U.S.C. 154(b) by 0 days.

(21) Appl. No.: 09/217,571

(22) Filed: Dec. 21, 1998

(30) Foreign Application Priority Data

Dec. 22, 1997 (DE) .............................. 197 57 309

(51) Int. Cl.⁷ ...................................... G01S 13/90
(52) U.S. Cl. ........................... 382/109; 382/48; 382/293; 342/192
(58) Field of Search ................................ 382/109, 48, 25, 382/293, 28; 342/192, 196, 25, 161

(56) References Cited

U.S. PATENT DOCUMENTS

| | | | |
|---|---|---|---|
| 5,179,598 | * 1/1993 | DiFoggio et al. | 382/48 |
| 5,274,715 | * 12/1993 | Hsu | 382/28 |
| 5,546,084 | 8/1996 | Hindman | 342/25 |
| 5,809,163 | * 9/1998 | Delhomme et al. | 382/109 |
| 5,812,082 | 9/1998 | Moreira et al. | 342/25 |
| 5,995,681 | * 11/1999 | Lee et al. | 382/293 |
| 6,084,989 | * 7/2000 | Eppler | 382/293 |

FOREIGN PATENT DOCUMENTS

| | | | |
|---|---|---|---|
| 0795762 | 9/1997 | (EP) | G01S/13/90 |
| 196 09 728 | 9/1997 | (DE) | G01S/13/90 |
| 9743664 | 11/1997 | (WO) . | |

OTHER PUBLICATIONS

Raney et al., "Precision SAR Processing Using Chirp Scaling", *IEEE Transactions on Geoscience and Remote Sensing*, 32:786–799, (1994).

Moreira et al., "Extended Chirp Scaling Algorithm for Air- and Spaceborne SAR Data Processing in Stripmap ScanSAR Imaging Modes", *IEEE Transaction on Geoscience and Remote Sensing*, 34:1123–1136, (1996).

Mangulis et al., "Patch Diameter Limitation due to High Chirp Rates in Focused SAR Images", *IEEE Transactions on Aerospace and Electronic Systems*, 30:1125–1129, (1994).

Carrara et al., "Spotlight Synthetic Aperture Radar", *The Artech House Remote Sensing Library*, p. 76–155 (1995).

Prati et al., "Spot Mode Sar Focusing with the w −K Technique", *IEEE International Geoscience and Remote Sensing Symposium*, 631–634, (1991).

Mittermayer et al., "Spotlight SAR Processing Using the Extended Chirp Scaling Algorithm", *IEEE*, pp.2021–2023, (1997).

* cited by examiner

*Primary Examiner*—Matthew C. Bella
*Assistant Examiner*—M. Choobin
(74) *Attorney, Agent, or Firm*—Browdy and Neimark (57) ABSTRACT

For two-dimensional processing of spotlight SAR data into exact image data, the spotlight SAR raw data are divided into azimuth sub-apertures and transformed into the range-time/azimuth-frequency domain through short azimuth FFTs. The obtained data are multiplied by a frequency-scaling function $H_f(f_a, t_r; r_0)$ and transformed into the two-dimensional frequency domain through short range FFTs, multiplied by an RV-phase-correction function $H_{RVP}(f_r)$ and subsequently transformed back into the range time/azimuth-frequency domain through short range IFFTs. The data formed in this manner are multiplied by the inverse frequency-scaling function $H_g(f_a, f_r)$, then transformed back into the two-dimensional frequency domain, multiplied by the phase-correction function $H_{korr}(f_a, f_r)$ and the azimuth-scaling function $H_a(f_a, f_r)$, and transformed back into the range-frequency/azimuth-time domain through short azimuth FFTS. Then the azimuth sub-apertures are re-assembled, multiplied by a de-ramping function $H_{der}(t_a)$ and transformed into the two-dimensional frequency domain through long azimuth FFTs.

2 Claims, 8 Drawing Sheets

Target remote range prior to frequency scaling

Fig. 6b

Target remote range following frequency scaling

Fig.6e
Target close range prior to frequency scaling

Fig.6f
Target close range following frequency scaling

M ETHOD OF PROCESSING SPOTLIGHT
SAR RAW DATA

FIELD OF THE INVENTION

The invention relates to a method of processing spotlight SAR raw data.

REVIEW OF RELATED TECHNOLOGY

A short introduction to SAR and spotlight SAR systems is given below. Radar having a synthetic aperture SAR (Synthetic Aperture Radar) is an instrument for remote sensing that is being used increasingly in imaging, monitoring and investigating the earth's surface. A system of this nature has a platform that moves at a constant speed, an antenna that points in a direction orthogonal to the direction of motion, and a coherent radar system that periodically transmits electromagnetic pulses.

The direction of platform motion is referred to as the azimuth direction, and the direction orthogonal thereto, which is oriented diagonally downward, is referred to as the range direction. In the normal SAR operating mode, which is called strip mode, during a flight over a region to be observed, a strip having the length of the segment that is flown over is imaged. The strip width is dependent on, among other things, the length of the time window in which the backscattered radar echoes from the transmitted pulse are received. The received echoes are converted (mixed) in frequency, quadrature-demodulated, digitized and stored in a two-dimensional echo memory.

Each SAR processing essentially comprises a range compression, a correction of the range migration and an azimuth compression:

The geometrical resolution in the range direction is a function of the bandwidth of the transmitted radar pulses. To improve this resolution, the transmitted pulses are modulated, for which, in most cases, a linear frequency modulation is used that will always be assumed hereinafter. Range compression means a filtering of the received signals in the range direction according to the matched filter theory, whereby the temporally-expanded signals are compressed into pulses.

The range migration is a consequence of the variation in the distance between the antenna and the point target in the formation of the synthetic aperture. The correction of the range migration describes the range variation of the echoes associated with a point target in the two-dimensional echo memory.

The pulse compression in the azimuth in accordance with the matched filter theory corresponds to the formation of the synthetic aperture. The azimuth modulation is likewise a consequence of the change in distance between the antenna and the target as the platform passes. The matched filtering means a coherent summation of all echoes associated with an azimuth position. If the range migration is corrected prior to the azimuth compression, the azimuth compression can be realized by a one-dimensional filter function.

Figure 7:
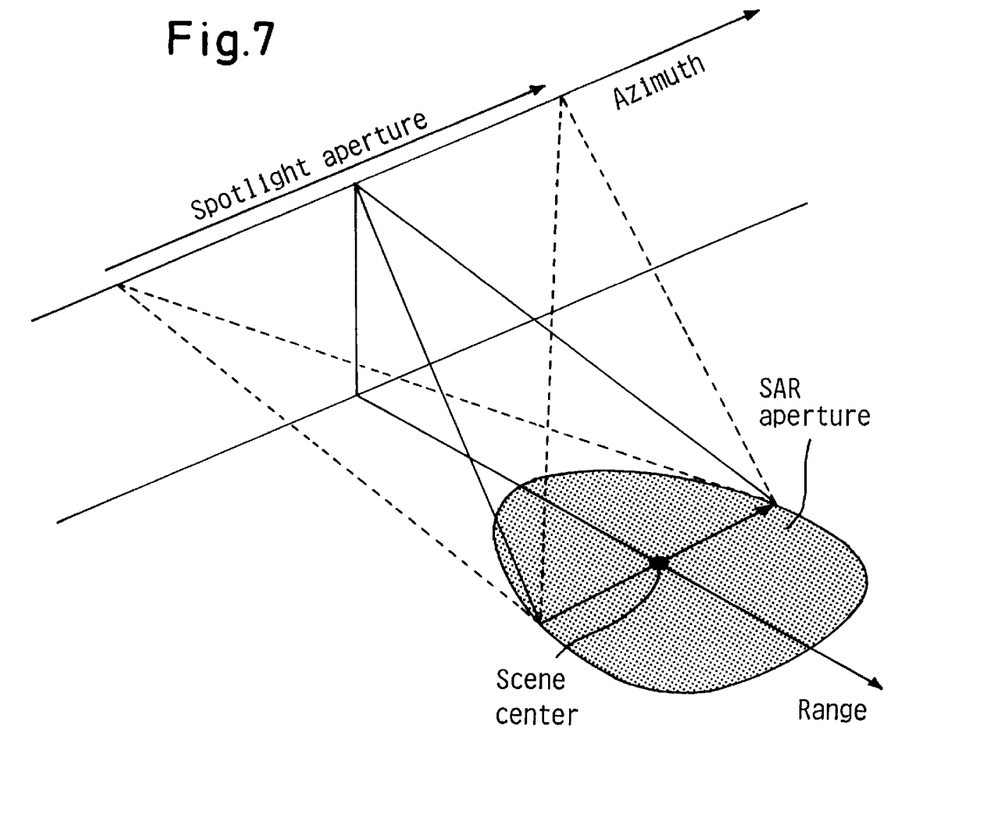
FIG. 7 is a schematic perspective representation of the spotlight geometry.

Spotlight SAR is an operating mode of SAR systems that permits a significantly-higher geometrical resolution. FIG. 7 illustrates the imaging geometry of a spotlight SAR system. In the spotlight mode, the antenna is directed at the center of the imaged scene during the entire pass. Because of this antenna steering, the scene is illuminated far longer than would be the case in the normal strip mode with an immovable antenna. The longer illumination time permits the formation of a longer synthetic aperture, or spotlight aperture.

FIG. 7 shows the synthetic aperture for the strip mode (SAR aperture) in the scene center, and the longer spotlight aperture over the azimuth axis. The long spotlight aperture produces azimuth signals that have a large bandwidth, and signify a high geometrical resolution in the azimuth direction. In spotlight mode, because of the antenna steering, a scene that is limited in the azimuth direction is imaged, whereas in strip mode, a scene theoretically having an unlimited azimuth expansion can be imaged.

To attain as high a geometrical resolution in the range direction as in the azimuth direction, a linearly frequency-modulated radar signal having a very large bandwidth is transmitted. To reduce the signal processing, particularly the requirements on sampling in the A/D conversion, the chirp modulation is often compensated during reception. In the process, prior to the A/D conversion, the received echoes are multiplied by a linear frequency-modulated signal that is centered on the center of the scene and has the inverted modulation rate of the transmitted signal. The result of the multiplication is a superpositioning of sinusoidal signals having frequencies that are linearly dependent on the range difference between the point target and the center.

The bandwidth of this signal is considerably smaller than the bandwidth of the received echoes for the case of a small size of the scene in the range direction. This is practically always a given in the spotlight mode.

Figure 8:
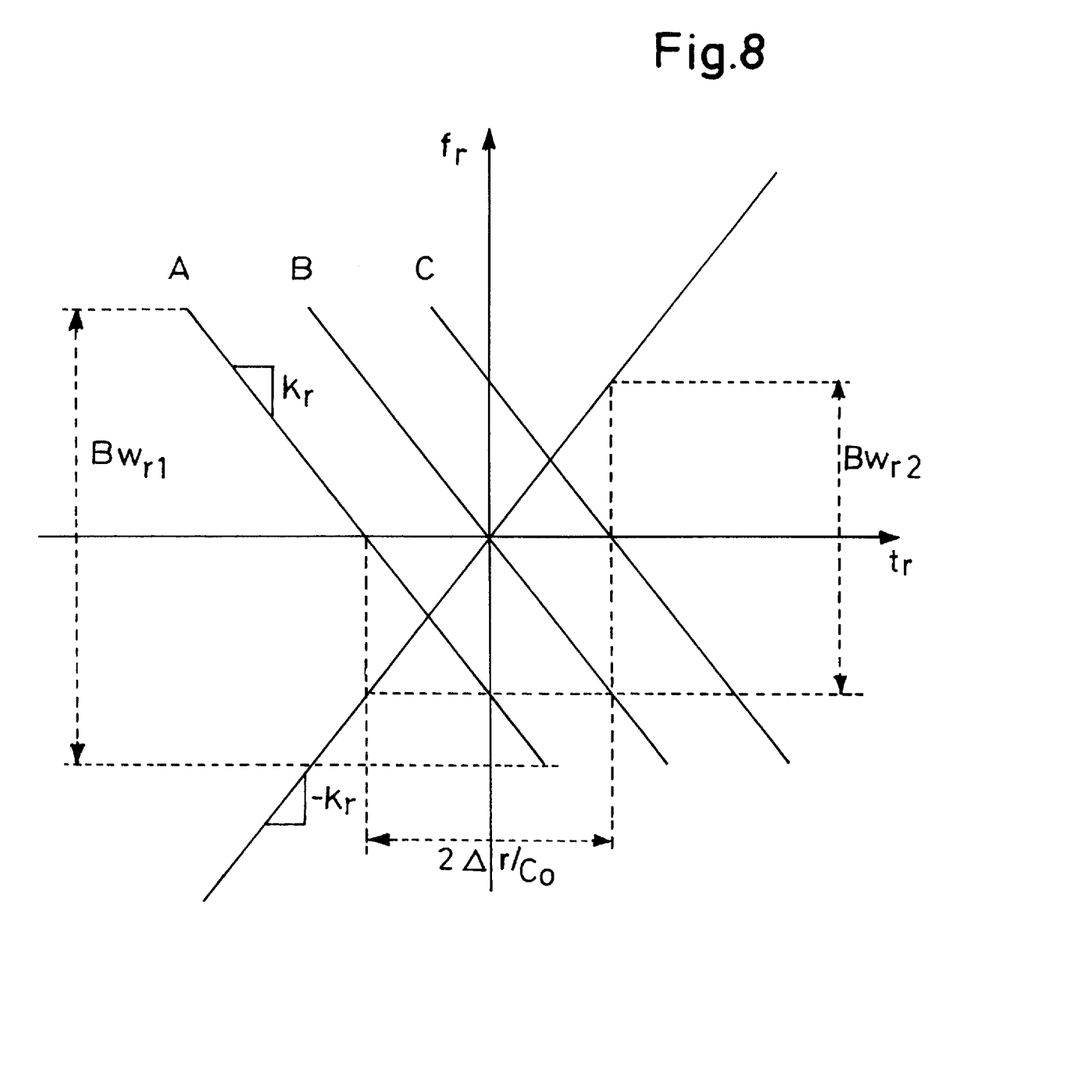
FIG. 8 is a schematic graphical view of a compensation of a chirp modulation during reception.

FIG. 8 illustrates the compensation of the chirp modulation during reception. Here the range time $t_r$ is shown on the abscissa, and the range frequency $f_r$ is shown on the ordinate. The signals from targets in the near range (A), in the center of the scene (B) and in the far range(C) possess the modulation rate $k_r$, while the compensation function possesses the modulation rate $-k_r$. The reduced bandwidth $B_{wr2}$ following the compensation of the chirp modulation during reception is a function of the range dimension $\Delta_r$ of the scene and the bandwidth of the transmitted signal $B_{wr1}$. The speed of light is represented by $c_0$.

The polar-format method, the range-migration method or an adapted strip mode, for example the chirp-scaling method, can be used for spotlight SAR processing. The azimuth scaling used in the present case was used in a similar form for ScanSAR processing. (See German Patent Application 196 09 728.2-35.) An SAR system that operates according to the spotlight principle is also known from U.S. Pat. No. 5,546,084.

The polar-format method (see the publication by G. Carrara, R. S. Goodman and R. M. Majewski: "Spotlight Synthetic Aperture Radar," Artech House Boston, London 1995, pp. 80 through 115) operates with compensation of the chirp modulation during reception, in which the motion compensation is likewise performed during reception for the center of the scene. This motion compensation is effected while the raw data are being recorded, by means of a shifting of the reception window as a function of the range variation of the echoes of the scene center.

This method begins with polar-format operation, which represents a conversion of the raw data from the polar format into Cartesian format. This conversion is effected with the aid of a two-dimensional interpolation. In addition to numerous correction steps, which also include the correction of the change in target range for the entire scene, the compression is effected in both the azimuth and range directions through FFT (Fast Fourier Transformation).

The range-migration method (see the publication by C. Prati, A. M. Guarnieri and F. Rocca, "Spot Modus SAR Focusing with the ω-k Technique," Proceedings of the 1991

IEEE International Geoscience and Remote Sensing Symposium (IGARSS), Espoo, Finland, Jun. 3–6, 1991, pp. 631 through 634) is derived from the method of processing seismic data. The first processing step is a one-dimensional Fourier transformation in the azimuth. Subsequently, the signal is multiplied by a two-dimensional phase function that precisely corrects the range migration for all targets in the range of the scene center. The range migration is corrected for the entire scene with the subsequent Stolt interpolation. Finally, a two-dimensional inverse Fourier transformation yields the completely-processed image.

In principle, each method used to process SAR data in the strip mode can also be used for the spotlight mode. An example of this is the chirp-scaling method (see the publication by Raney R. K., Runge H., Bamler R., Cumming I. and Wong F.: "Precision SAR Processing Using Chirp Scaling," IEEE Transactions on Geoscience and Remote Sensing, Vol. 32, pp. 786 through 799, July 1994, and A. Moreira, J. Mittermayer and R. Scheiber, "Extended Chirp Scaling Algorithm for Air- and Spaceborne SAR Data Processing in Stripmap and ScanSAR Imaging Modes," IEEE Trans. on Geosci. and Remote Sensing, Vol. 34, No. 5, September 1996, pp. 1123 through 1136).

The chirp-scaling method requires raw data that are linearly frequency-modulated in the range direction. The first processing step is a Fourier transformation in the azimuth, followed by the chirp-scaling operation. In the chirp-scaling operation, the trajectories that describe the phase centers of the range signals associated with point targets are matched to the course of a reference trajectory. Thus, after a Fourier transformation in the range direction, the range migration can be effected simultaneously for all ranges through a shift. The range compression is likewise performed at this point through matched filtering. The azimuth compression follows an inverse Fourier transformation in the range, and is followed by the final, inverse Fourier transformation in the range.

A disadvantage of the polar-format method is that complex interpolations in the azimuth and range are required for the transformation from the polar format into the cartesian format.

The range-migration method has the following disadvantages:

The Stolt transformation, which represents an interpolation, is necessary for a complete correction of the range migration.

The instantaneous azimuth bandwidth must be sufficiently sampled by the pulse-repetition frequency (PRF). The total bandwidth in the azimuth is larger than the instantaneous azimuth bandwidth, because the antenna steering correspondingly increases the bandwidth. Prior to the azimuth compression, the sampling frequency must be increased in the azimuth so that the total bandwidth can be unambiguously represented in the azimuth.

The azimuth reference function must have a length corresponding to the total azimuth bandwidth. As a result, the required size of the azimuth dimension is equal to the length of the azimuth reference function plus the azimuth length of the processed scene. The large expansion of the azimuth dimension increases the calculation efforts considerably.

A further disadvantage of the chirp-scaling method is that a linear frequency modulation is required in the range. Hence, no raw data can be processed directly with compensation of the chirp modulation during reception. Consequently, the quantity of data and the sampling frequency are increased in the range.

OBJECT AND SUMMARY OF THE INVENTION

The present invention has an object, among others, to overcome deficiencies in the prior art such as noted above.

It is therefore one object of the invention to render a method of processing spotlight SAR raw data highly-precise and very efficient, without requiring numerous interpolations.

In the method of the invention, a sub-aperture processing with frequency scaling is performed for processing in the range, as is a SPECAN method that is improved by the azimuth scaling, for processing in the azimuth. In this method of the invention, raw data can therefore be used directly with a compensation of the chirp modulation during reception, because the range migration is corrected by a frequency scaling that can process raw data without linear frequency modulation in the range, unlike the chirp-scaling method. During the processing in the range, a division into sub-apertures takes place; consequently, a lower pulse-repetition frequency (PRF) can be used, because the sampling theorem needs only be fulfilled within the sub-apertures in the azimuth direction.

In accordance with the invention, the azimuth processing is performed with the aid of the SPECAN method improved by the azimuth scaling, by means of which a long azimuth reference function and thus a large azimuth dimension are prevented during processing. With the de-ramping used in the SPECAN method, the sampling in the azimuth need not be increased prior to the azimuth compression, because the bandwidth requirement in the azimuth is determined according to the de-ramping of the azimuth expansion of the scene, and spotlight scenes typically have a small azimuth expansion. The same effect is utilized in the range direction through the compensation of the chirp modulation during reception. In the method of the invention, therefore, the disadvantages of the SPECAN method are eliminated by the azimuth scaling.

At the end of a processing, the azimuth-frequency domain is present, but after the azimuth scaling, the Doppler rate in all ranges is the constant scaling Doppler rate. Because the Doppler rate is therefore no longer dependent on the range, at the end of processing, the same geometrical azimuth scaling is present in all ranges.

The azimuth scaling also takes into account the hyperbolic azimuth modulation, so the azimuth processing for all ranges is highly precise and no new sampling with interpolation is necessary for geometrical correction in the azimuth. Furthermore, the desired sampling interval in the processed image can be established through the selection of the scaling Doppler rate.

For frequency scaling of SAR raw data (stripmap, ScanSAR, spotlight, hybrid mode) with a demodulation during reception, an exact correction of the range migration is attained without interpolation through multiplication with two reference phases in the range-time/azimuth-frequency domain and a phase modulation. Here the correction principle is the scaling of the range frequency.

Thus, overall the following advantages are attained with the method of the invention:

With the frequency scaling, raw data can be used with a compensation of the chirp modulation during reception.

With the use of frequency scaling, no interpolation is necessary for correcting the range migration. With the sub-aperture processing, a lower pulse-repetition frequency (PRF) can be used in the processing. During the azimuth processing, the sampling frequency can be kept low due to the SPECAN method.

The sub-aperture processing further permits the use of short Fast Fourier Transformations (FFTs), which in turn leads to a distinct reduction in the calculation effort. With the SPECAN method, the size of the azimuth dimension can be reduced in the processing; the azimuth scaling assures a highly-precise processing in the azimuth, despite the use of the SPECAN method.

The correct scaling of the time range in the azimuth direction can be established through the selection of the scaling Doppler rate in the azimuth scaling. The new sampling required in the SPECAN method, which is associated with interpolation in the azimuth direction, can be omitted. The entire processing is now effected only with the use of multipliers and Fourier transformations, with interpolations being avoided altogether. Consequently, a highly-precise, phase preserving processing is attained.

BRIEF DESCRIPTION OF THE DRAWING FIGURES

The above and other objects and the nature and advantages of the present invention will become more apparent from the following detailed description of an embodiments taken in conjunction with drawings, wherein:

FIGS. 3-1 through 3-7 are schematic graphical representations of a frequency scaling operation;

DETAILED DESCRIPTION OF THE PREFERRED EMBODIMENT

Figure 1:
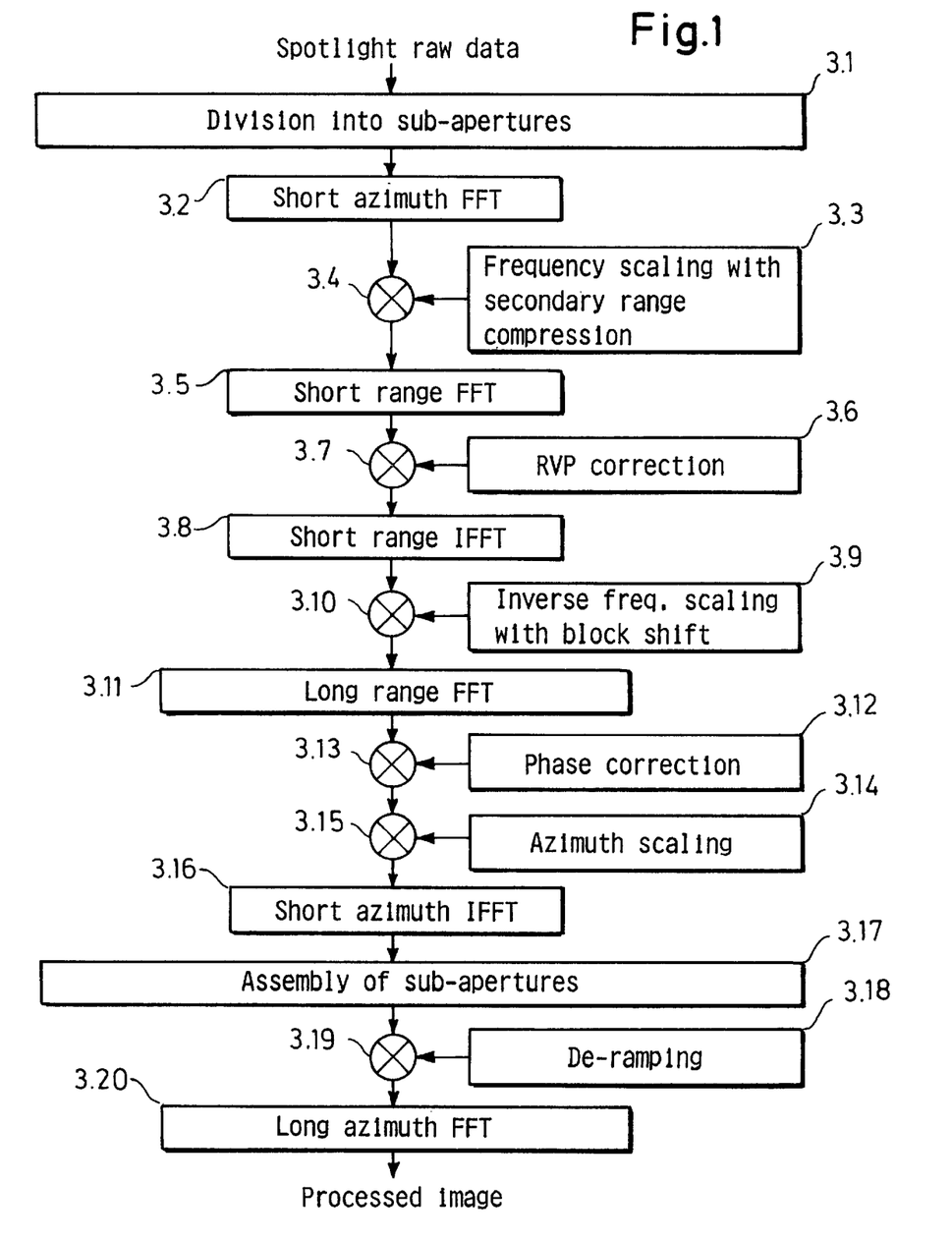
FIG. 1 is a schematic flow chart view of a preferred procedure of the method of the invention.

FIG. 1 shows an embodiment of the method of the invention. Here the spotlight SAR signal of a point target can be described according to the compensation of the chirp modulation during reception in the manner that ensues from the following Eq. (1):

$$s(t_a, t_r; r_o) = C\exp\left[-j \cdot \frac{4 \cdot \pi}{c_o} \cdot k_r \cdot (r(t_a; r_o) - r_{ref}) \cdot \left(t_r - \frac{2 \cdot r_{ref}}{c_o}\right)\right] \quad (1)$$

$$\exp\left[j \cdot \frac{4 \cdot \pi}{c_o^2} \cdot k_r \cdot (r(t_a; r_o) - r_{ref})^2\right] \cdot$$

$$\exp\left[-j \frac{4 \cdot \pi}{\lambda} \cdot r(t_a; r_o)\right]$$

Here $t_a$ indicates the azimuth time, $t_r$ indicates the range time, $r_0$ the shortest distance between the antenna and a point target, C a complex constant, $c_0$ the speed of light, $k_r$ the modulation rate in the range, $r(t_a; r_0)$ the range variation, $r_{ref}$ the distance between the antenna and the scene center, and $\lambda$ the wavelength.

The spotlight raw data are first divided into sub-apertures in step 3.1. This division is described below in conjunction with FIG. 2, in which the azimuth time $t_a$ is shown on the abscissa and the azimuth frequency $f_a$ is shown on the ordinate. The azimuth signals A and B having a Doppler rate $k_{a,near}$ originate from point targets that limit the imaged scene in the azimuth and lie in the near range. A symmetrical side-view geometry is assumed in FIG. 2. The scene expansion arbitrarily corresponds to the length of the spotlight aperture.

Figure 2:
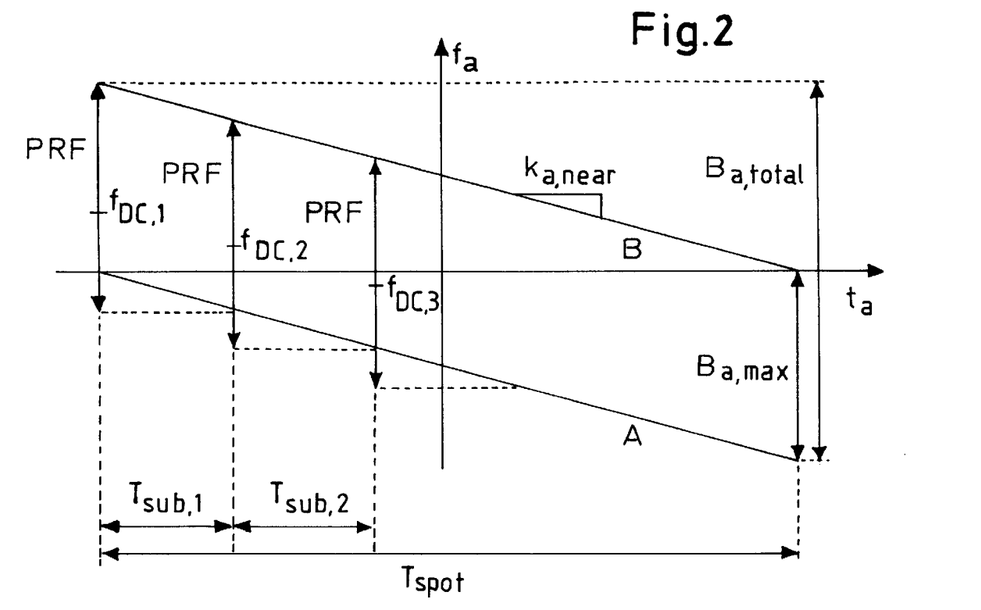
FIG. 2 is a schematic graphical view of formation of the sub-apertures.
Figure 3:
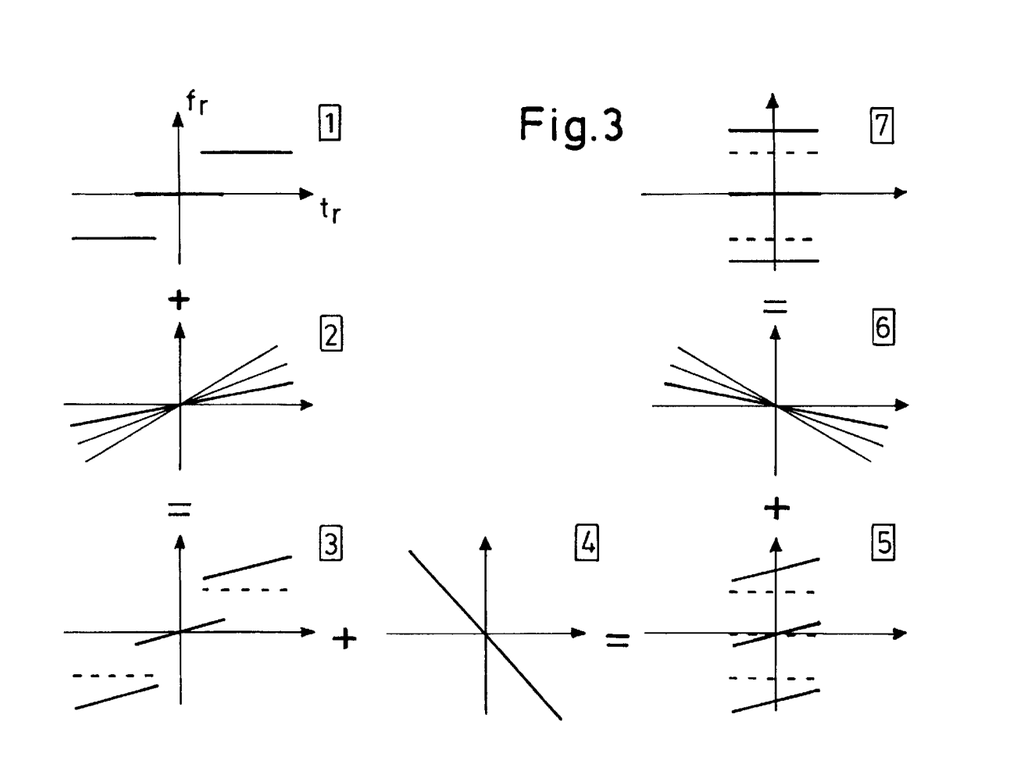

During the processing in the range, an azimuth bandwidth $B_a$ of a point target must be sampled sufficiently. Because the Doppler rate varies over the range with a constant sampling time $T_{spot}$, targets in the short range have a greater azimuth bandwidth. The maximum momentary bandwidth $B_{a,max}$ is therefore the product of the spotlight aperture $T_{spot}$ and the Doppler rate $k_{a,near}$ in the near range.

$$B_{a,max} = T_{spot} \cdot k_{a,near} \quad (2)$$

The total azimuth bandwidth $B_{a,total}$ of the scene is greater than the maximum instantaneous bandwidth $B_{a,max}$, because the azimuth positioning of a target causes a frequency offset. Thus, the total azimuth bandwidth $B_{a,total}$ of the scene is calculated as a function of the scene expansion $\Delta a$ in the azimuth from Eq. (3), in which V indicates the speed.

$$B_{a,total} = B_{a,max} + \frac{\Delta a}{V} \cdot k_{a,near} \quad (3)$$

Figure 4:
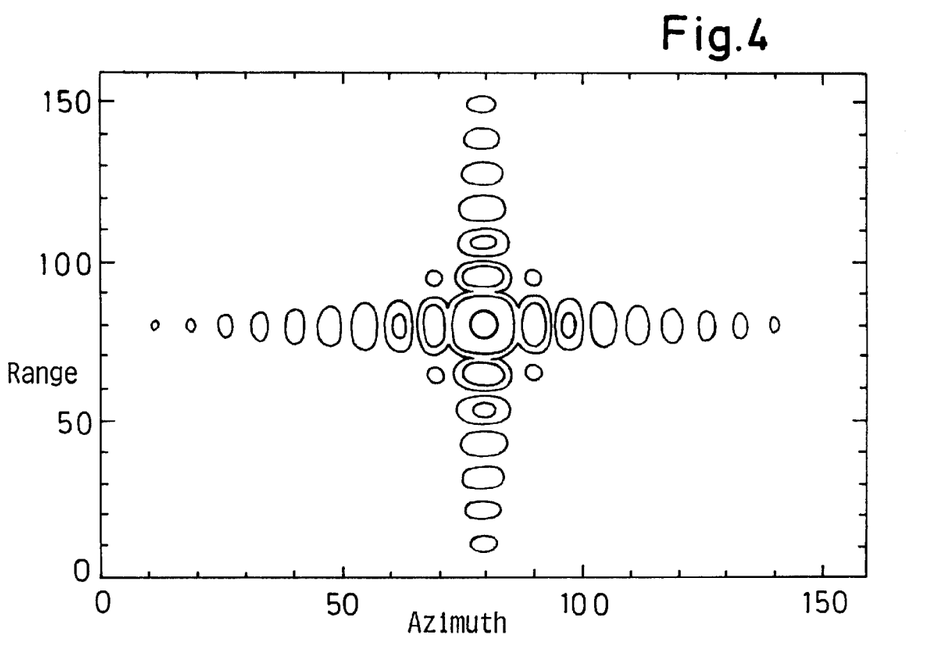
FIG. 4 is a graphical view showing the result of processing a one-point target.

In the use of the basic chirp-scaling method, the pulse-repetition frequency PRF would have to be at least as large as the total azimuth bandwidth $B_{a,total}$ in order to prevent ambiguous azimuth frequencies during the correction of the range variation. Ambiguous azimuth frequencies result in a false correction. Through the use of sub-aperture processing, a lower pulse-repetition frequency (PRF) is sufficient. The calculation of a sub-aperture time $T_{sub}$ according to Eq. (4) ensues directly from FIG. 4.

$$T_{sub} \leq \frac{PRF - B_{a,max}}{k_{a,near}} \quad (4)$$

After the division into sub-apertures (step 3.1), the processing for each sub-aperture i is continued with the sub-aperture's own Doppler centroids $f_{DC,i}$. To prevent a poor processing result due to the sub-aperture processing, the sub-apertures are formed with slight overlapping. This is expressed by the $\leq$ sign in Eq. (4).

Hereinafter "short azimuth FFT or IFFT" refers to the short length or small number of points of FFT/IFFT operations in the azimuth direction through use of a sub-aperture processing. After the sub-apertures have been assembled (as discussed below in connection with step 3.17), the total length of the time signal is reproduced and the final FFT operation must therefore be a "long azimuth FFT."

In a "long azimuth FFT," the sinusoidal time signals in the azimuth-time domain are compressed into short pulses in the azimuth-frequency domain. Therefore, a "long azimuth FFT" must also have sufficient points for assuring an adequately high scanning of the azimuth signal in the azimuth-frequency domain for the resolution in the azimuth.

"Short range FFT or IFFT and long range FFT" are to be understood as follows: The length of a "short range FFT" is defined by the number of points of the raw data in the range direction. A "long range FFT" must have sufficient points to assure an adequately-high sampling of the range signal in the range-frequency domain for the resolution in the range. The expressions "short range FFT or IFFT" and "long range FFT" therefore relate to a final compression of the sinusoidal signals in the range-time domain into short pulses in the range-frequency domain that was performed through the last "long range FFT."

In the next processing step (step 3.2), the transformation into the range Doppler domain for short FFTs is performed in the azimuth. In step 3.2, the signals that are now range-compressed due to the compensation of the chirp modulation during reception are multiplied by the frequency-scaling function $H_f$ (3.3), which is shown below in Eq. (5), in a multiplier 3.4 for correcting the range variations.

$$H_r(f_a, t_r; r_o) = \exp\left[j \cdot \frac{2 \cdot \pi \cdot k_r}{c_o} \cdot \beta(f_a) \cdot t_r^2\right] \cdot \quad (5)$$

$$\exp\left[j \cdot 2\pi \cdot \frac{\beta^2 - 1}{c_o^2 \cdot \beta^3} \cdot r_o \cdot \lambda \cdot k_r^2 \cdot \left(t_r - \frac{2 \cdot r_{ref}}{c_o}\right)^2\right]$$

$$W(f_a, t_r) = \sqrt{\left(1 + \frac{k_r \cdot \lambda}{c_o} \cdot \left(t_r - \frac{2 \cdot r_{ref}}{c_o}\right)\right)^2 - \frac{f_a^2 \cdot \lambda^2}{4 \cdot V^2}} \quad (6)$$

$$\beta(f_a) = \sqrt{1 - \left(\frac{f_a \lambda}{2V}\right)^2} \quad (7)$$

In the second exponential term, the frequency-scaling function $H_f(f_a, t_r; r_o)$ includes the expression required for a secondary range compression; consequently, the secondary range compression is likewise performed in this processing step.

Through a secondary range compression, a phase term arising from the coupling of azimuth and range signals is corrected. The coupling is a consequence of the change in target range between the antenna and an illuminated point target during a pass by the platform. The second exponential expression in the frequency-scaling function in Eq. (5) represents the correction function for a secondary range compression. In contrast, a first range compression is performed through the last "long range FFT," which performs the final compression of the sinusoidal signals in the range-time domain into short pulses in the range-frequency domain.

For implementing the method, it is necessary to approximate the range $r_0$ in the second exponential expression for the secondary range compression through the range $r_{ref}$. Because of the slight expansion in the range of a spotlight scene, this approximation causes no measurable worsening of the processing result. The precision of the secondary range compression, can, however, be increased through consideration of additional terms of a higher order than in the Taylor approximation of the root expression $W(f_a, t_r)$, which is given in Eq. 6, in the azimuth-frequency domain.

In step 3.5, the data are transformed into the two-dimensional frequency range through short range FFTs. There, the Residual Video Phase (RVP) is corrected in a further multiplier unit (step 3.7) with the RVP correction function (step 3.6) from Eq. (8). The RVP occurs during the compensation of the chirp modulation during reception, and corresponds to a range-dependent time shift in the range.

$$H_{RVP}(f_r) = \exp\left[-j \cdot \pi \cdot \frac{f_r^2}{\beta \cdot k_r}\right] \quad (8)$$

Following the RVP correction, an inverse transformation into the range Doppler range is effected through short range IFFTs (Inverse Fast Fourier Transformations) in step 3.8. There a small, linear frequency modulation that was inserted through the frequency-scaling operation is removed in a multiplier unit 3.10 with the aid of an inverse frequency-scaling function shown in Eq. (9).

$$H_{lf}(f_a, t_r) = \exp[\pi \cdot k_r \cdot (\beta^2 - \beta) \cdot t_r^2] \cdot \quad (9)$$

$$\exp\left[j \cdot \frac{4 \cdot \pi \cdot k_r}{c_o} \cdot r_{ref} \cdot (1 - \beta) \cdot t_r\right]$$

The first exponential term in Eq. (9) serves to remove this small frequency modulation. A range-frequency shift that is dependent on the azimuth frequency, but independent of the range, is performed with the second exponential term (block shift). This shift completely corrects the range migration. The range migration was adapted in the frequency scaling, that is, the range dependency of the range migration was eliminated in the frequency scaling.

The long FFTs occurring in the range in step 3.11 must be performed with a point number $N_{FFT,r}$ (see Eq. (10) below) that is sufficient for the range resolution $\rho_r$. The range signals are compressed in the frequency range. Hence, the sampling interval in the range-frequency domain $\Delta f_r$ must correspond at least to the range resolution. In Eq. (10), the sampling frequency is represented by $S_f$.

$$\Delta f_r = \frac{2 \cdot \rho_r \cdot k_r}{c_o}; \quad N_{FFT,r} = \frac{S_f}{\Delta f_r} \quad (10)$$

The expansion to the point number $N_{FFT,r}$ is effected through the insertion of zeroes before the transformation. Next, in step 3.12, a range-independent azimuth phase is corrected by a multiplication in the multiplier unit 3.13 with the correction function $H_{kor}$ from Equation (11). The azimuth phase arises during the range-independent shift of the range frequencies in Eq. (9).

$$H_{korr}(f_a, f_r) = \exp\left[-j \cdot \frac{4 \cdot \pi \cdot k_r}{c_o} \cdot \frac{2 \cdot r_{ref}}{c_o} \cdot (1 - \beta) \cdot \left(r_{ref} - \frac{f_r \cdot c_o}{2 \cdot k_r}\right)\right] \quad (11)$$

Afterward, the azimuth scaling is multiplied by the azimuth-scaling function from Eq. (12) in a further multiplier unit 3.15 in step 3.14. In the azimuth scaling, the hyperbolic phase course of the azimuth signals, which varies with range, is transferred into the purely-quadratic phase course described by the scaling Doppler rate $k_{a,scl}$.

$$H_a(f_a, f_r) = \exp\left[j4 \cdot \frac{\pi}{\lambda} \cdot \left(r_{ref} - \frac{f_r \cdot c_o}{2 \cdot k_r}\right) \cdot (\beta - 1)\right] \cdot \quad (12)$$

$$\exp\left[j \cdot \frac{\pi}{k_{a,scL}} \cdot f_a^2\right]$$

Afterward, in step 3.16, the signals are transformed into the azimuth-time/range-frequency domain through short IFFTs. In this range, the individual sub-apertures are assembled in step 3.17. After this, the bandwidth $B_a$ required for the high azimuth resolution is again available for each point target.

Next, de-ramping is performed in the azimuth through the multiplication of the azimuth signals by the de-ramping function in a multiplier unit 3.19 in step 3.18. The de-ramping function is a linearly frequency-modulated signal having the inverted scaling Doppler rate $k_{a,scl}$ that is inserted in the azimuth scaling.

$$H_{der}(t_a) = \exp[j \cdot \pi \cdot k_{a,scl} \cdot t_a^2] \tag{13}$$

The length $N_{FFT,a}$ of the long azimuth FFTs ending the processing results according to Eq. (14) as a function of the azimuth resolution $\rho_a$ and the scaling Doppler rate $k_{a,scl}$ in step 3.20.

$$\Delta f_a = \frac{\rho_a \cdot k_{a,scl}}{V}; \quad N_{FFT,a} = \frac{PRF}{\Delta f_a} \tag{14}$$

FIG. 3 shows the frequency-scaling operation in detail. Here the range time $t_r$ is shown on the abscissas, and the range frequency $f_r$ is shown on the ordinates. The plot 1 (FIG. 3-1) shows the signals in the range direction of three point targets following the compensation of the chirp modulation during reception. The targets are located at the same azimuth position, but in the ranges of short range, scene center and remote range. The reference range for the frequency scaling is the range that was also used for compensating the chirp modulation during reception. The temporal shift of the signals corresponds to the RV phase.

Following the compensation of the chirp modulation during reception, a dependency of the range frequency $f_r$ on the azimuth frequency $f_a$ exists in addition to the linear connection between the range $r_0$ and the range frequency $f_r$ that is constant for a range. The dependency on the azimuth frequency is a consequence of the range variation, and is eliminated by the first exponential expression in Eq. (5).

In plot 2 (FIG. 3-2), the frequency-scaling function is represented as a linear frequency modulation. The dependency on the azimuth frequency is indicated by a plurality of scaling functions in plot 2 (FIG. 3-2). Only one scaling function is used for the signals in plot 1 (FIG. 3-1), which are located at the same azimuth position. This can be, for example, the scaling function shown in boldface.

Plot 3 (FIG. 3—3) shows the result of the frequency scaling. The signals prior to the operation are shown as dashed lines, while the signals following the operation are shown as solid lines. The mid-frequencies of the signals are scaled as a function of the range and the azimuth frequency. The mid-frequency of the target in the short range is shifted downward, and the mid-frequency of the target in the remote range is shifted upward. The mid-frequency of the target at the reference range is unchanged. The frequency scaling further causes a small, undesired linear frequency modulation of the signals, which will be removed later.

Next, the RV phase is removed. This operation can be understood as scaling as a function of the range frequency. Plot 4 (FIG. 3-4) shows such a scaling function. The result in plot 5 (FIG. 3-5) shows all signals at the same range time. Through multiplication by the inverse frequency-scaling function in plot 6 (FIG. 3-6), which also includes the term for range-independent shifting of the range frequencies, the aforementioned, undesired linear frequency modulation is removed, and the change in target range is completely corrected. Finally, plot 7 (FIG. 3-7) shows the result of the frequency scaling, removal of the RV phase and the inverse frequency scaling. The constant frequency of the signal in the short range was reduced, the constant frequency of the signal in the remote range was increased, and the constant frequency zero of the signal in the reference range was not changed. Due to the dependency of the frequency scaling on the azimuth frequency, the range variation was. thus corrected.

FIG. 4 shows the result of the processing of a simulated point target with the method of the invention. Because no weighting functions were used during the processing, the contour-line representation in FIG. 4 shows a two-dimensional sinc function.

Figure 5:
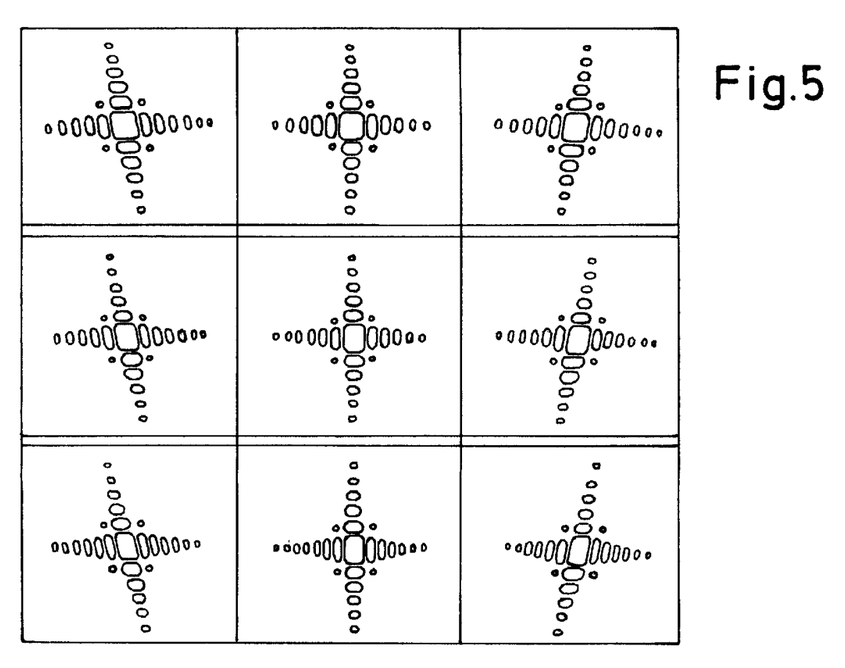
FIG. 5 is a photographic-graphical view showing the result of processing nine point targets.

FIG. 5 shows a gray-value representation of the result of the processing of nine point targets having different range and azimuth positions. The targets are arranged such that the targets in the corner positions limit a scene with the expansions of 750×1000 m (meters) in azimuth and range. The reference range of the scene center was 4000 m. The processing was performed without weighting of the reference functions. The gray stripes between the individual pulse responses indicate that the targets are further apart than shown in FIG. 5. The results were two-dimensional sinc-type (sinc x=sinx/x) pulse responses for all point targets. The deviation of the first three side lobes from the ideal pulse response was less than 0.1 dB. The geometrical resolutions that are possible in theory with the simulation parameters are about 0.3 m×0.7 m in the azimuth and range. The maximum deviation of the resolution from the theoretical value was 2.1%.

Figure 6A:
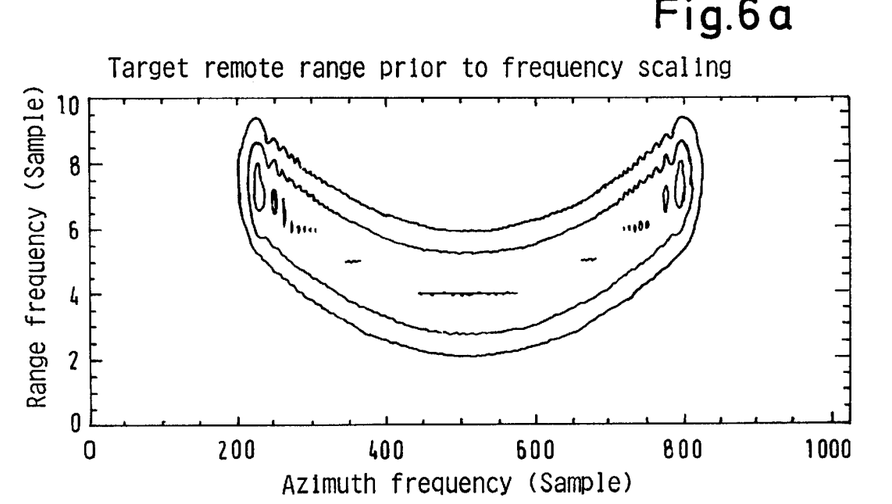
FIGS. 6a–6f are graphical views of a correction of the range migration through frequency scaling for targets in the far range, in the reference range and for targets in the near range.
Figure 6B:
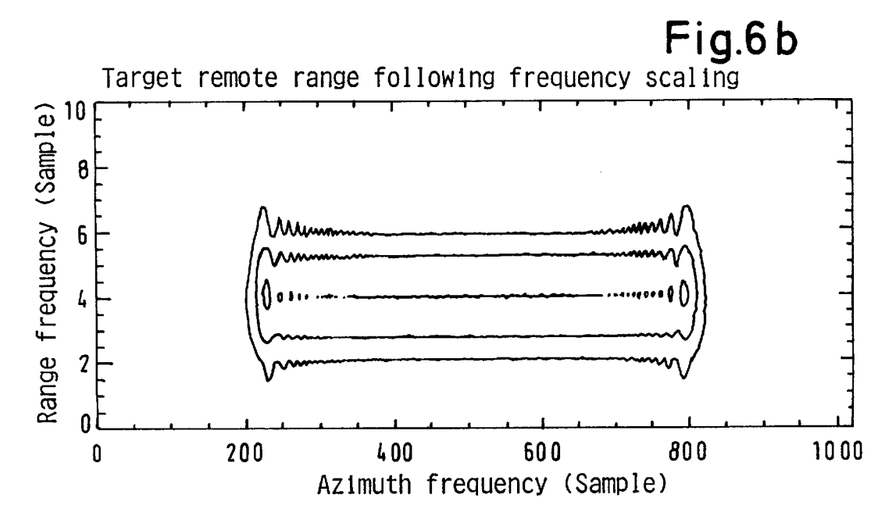
Figure 6C:
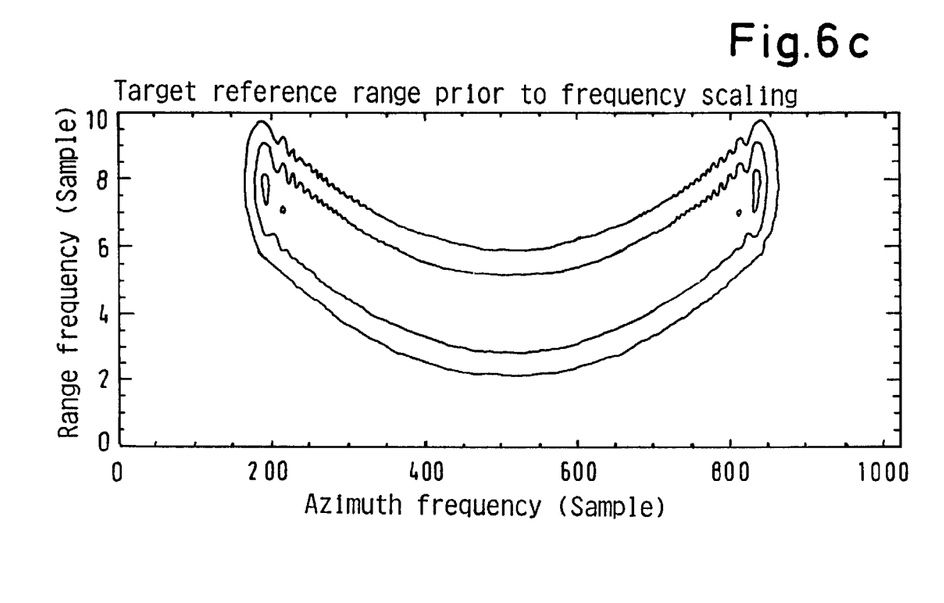
Figure 6D:
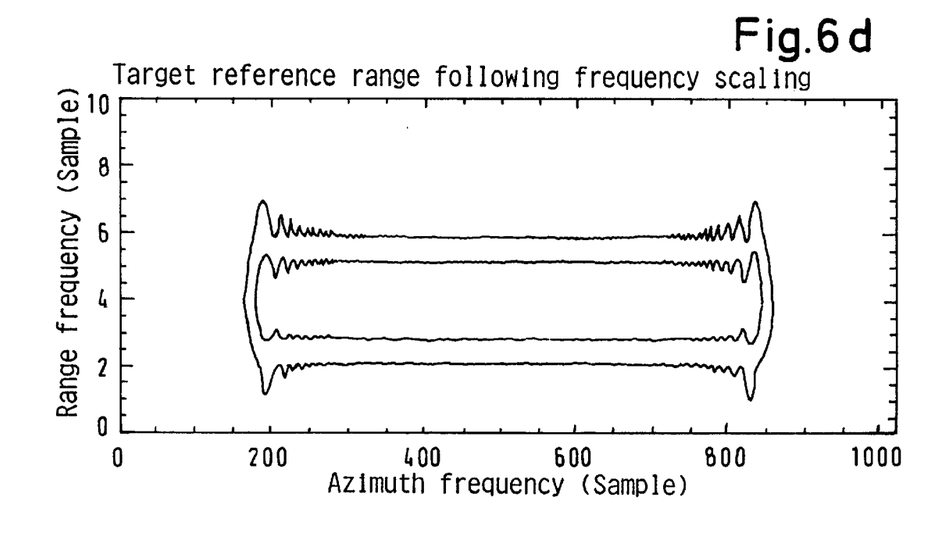
Figure 6E:
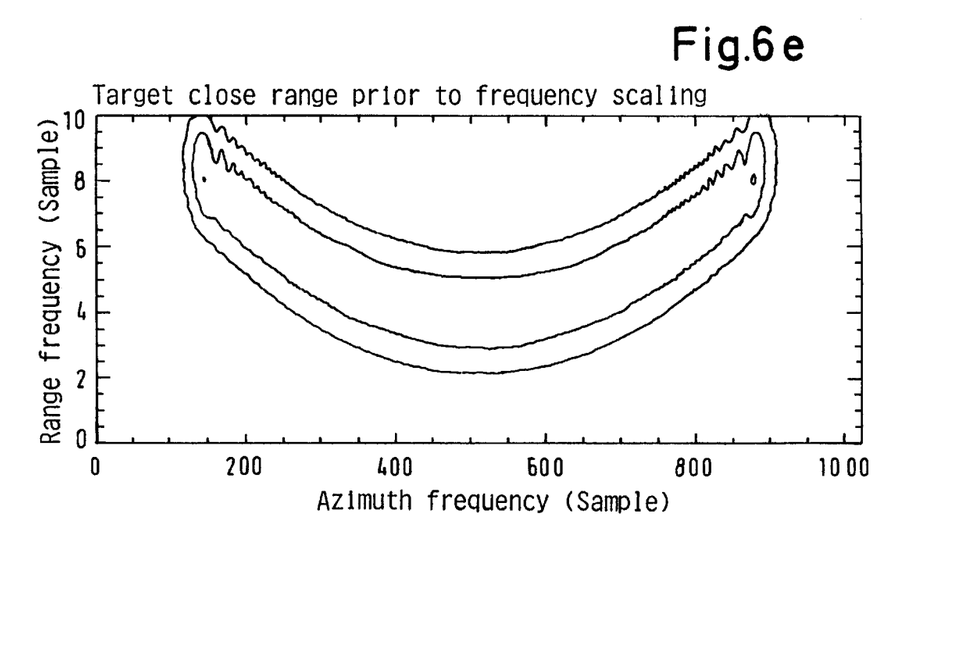
Figure 6F:
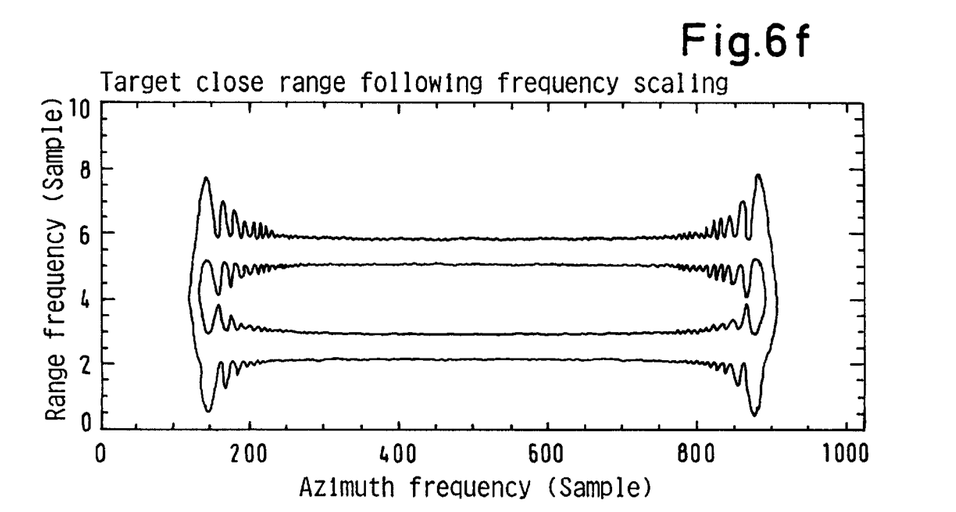

FIGS. 6a through 6e show signals of a target in the remote range, reference range and short range, respectively, in the two-dimensional frequency range as a contour-line representation, with the azimuth frequency [Sample] being shown on the abscissas and the range frequency [Sample] being shown on the ordinates, FIGS. 6a, 6c and 6e illustrate plots of signals prior to the frequency scaling, while FIGS. 6b, 6d and 6f show plots of signals following the frequency scaling, in which the change in target range is corrected.

The method of the invention can also be used for raw data without compensation of the chirp modulation during reception. In this instance, the frequency-scaling operation is replaced by the conventional chirp-scaling operation, but the compensation of the chirp modulation is performed as the first processing step, instead of during reception, in the signal processing.

The method can also be used in the processing of spotlight data that have been recorded with the aid of a curved flight. In a curved flight, the antenna position is fixed, i.e., the antenna is not steered. For processing with the method of the invention, the additional change in target range due to the curved flight is corrected through an additional shift of the data during the frequency scaling.

The method of the invention can also be used in the processing of data in the hybrid mode. In this mode, the antenna is steered more slowly than in the spotlight mode. It therefore represents a hybrid of the stripmap mode and the spotlight mode. In this mode, both the value for the geometrical resolution and the expansion of the scene in the azimuth lie between the values of the stripmap mode and the spotlight mode.

The method can also be used in processing of stripmap-mode SAR raw data if the compensation of the chirp modulation is performed during reception in processing.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

Thus the expressions "means to . . . " and "means for . . . " as may be found in the specification above and/or in the claims below, followed by a functional statement, are intended to define and cover whatever structural, physical, chemical or electrical element or structure may now or in the future exist which carries out the recited function, whether or not precisely equivalent to the embodiment or embodiments disclosed in the specification above; and it is intended that such expressions be given their broadest interpretation.

What is claimed is:

1. A method of processing two-dimensional spotlight SAR raw data into image data, comprising sequential steps of:

(3.1) dividing the spotlight SAR raw data into azimuth sub-aperture data;

(3.2) transforming the sub-aperture data, via short azimuth FFTS, into azimuthal frequency data, whereby the raw data comprises two-dimensional time data;

(3.3, 3.4) multiplying the two-dimensional data by a frequency-scaling function $H_f(f_a, t_r; r_o)$ defined by $$H_r(f_a, t_r; r_o) = \exp\left[j \cdot \frac{2 \cdot \pi \cdot k_r}{c_o} \cdot \beta(f_a) \cdot t_r^2\right] \cdot \tag{5}$$
$$\exp\left[j \cdot 2\pi \cdot \frac{\beta^2 - 1}{c_o^2 \cdot \beta^3} \cdot r_o \cdot \lambda \cdot k_r^2 \cdot \left(t_r - \frac{2 \cdot r_{ref}}{c_o}\right)^2\right]$$

wherein $f_a$ is azimuth frequency, $t_r$ is range time, $r_0$ is a shortest distance from a target, $k_r$ is a modulation rate of the transmitted pulses in the range, $r_{ref}$ is a reference range, $f_r$ is a range frequency, $c_0$ is the speed of light, $\lambda$ is wavelength, and wherein $\beta$ is given by $$\beta(f_a) = \sqrt{1 - \left(\frac{f_a \lambda}{2V}\right)^2} \tag{7}$$

where V is speed, whereby a secondary range compression of the two-dimensional data is performed;

(3.5) transforming the two-dimensional data, via short range FFTs, into two-dimensional frequency data (azimuthal and range frequency domain);

(3.6, 3.7) multiplying the two-dimensional frequency data by a residual-video-phase correction function $H_{RVP}$ given by $$H_{RVP}(f_r) = \exp\left[-j \cdot \pi \cdot \frac{f_r^2}{\beta \cdot k_r}\right] \tag{8}$$

(3.8) transforming the two-dimensional frequency data, via short range IFFTs, back into range time/azimuthal frequency domain;

(3.9) multiplying the two-dimensional data by an inverse frequency-scaling function $H_{if}$ given by $$H_{if}(f_a, t_r) = \exp[\pi \cdot k_r \cdot (\beta^2 - \beta) \cdot t_r^2] \cdot \tag{9}$$
$$\exp\left[j \cdot \frac{4 \cdot \pi \cdot k_r}{c_o} \cdot r_{ref} \cdot (1 - \beta) \cdot t_r\right]$$

whereby a block shift is performed;

(3.11) transforming the two-dimensional data, via long range FFTs, into two-dimensional frequency domain; multiplying the two-dimensional frequency data by the phase-correction function $H_{koor}$ given by $$H_{korr}(f_a, f_r) = \exp\left[-j \cdot \frac{4 \cdot \pi \cdot k_r}{c_o} \cdot \frac{2 \cdot r_{ref}}{c_o} \cdot (1 - \beta) \cdot \left(r_{ref} - \frac{f_r \cdot c_o}{2 \cdot k_r}\right)\right] \tag{11}$$

(3.15) subsequently multiplying the two-dimensional frequency data by an azimuth-scaling function $H_a(f_a, f_r)$ given by $$H_a(f_a, f_r) = \exp\left[j 4 \cdot \frac{\pi}{\lambda} \cdot \left(r_{ref} - \frac{f_r \cdot c_o}{2 \cdot k_r}\right) \cdot (\beta - 1)\right] \cdot \tag{12}$$
$$\exp\left[j \cdot \frac{\pi}{k_{a,scL}} \cdot f_a^2\right]$$

wherein $k_{a,scl}$ is a scaling Doppler rate;

(3.16) transforming the two-dimensional frequency data, via short azimuth FFTs, into the range frequency/azimuthal time domain;

(3.17) re-assembling the azimuth sub-apertures;

(3.18, 3.19) multiplying the two-dimensional data of the azimuth sub-apertures by a de-ramping function $H_{der}$ ($t_a$) given by $$H_{der}(t_a) = \exp[j \cdot \pi \cdot k_{a,scl} t_a^2] \tag{13}$$

wherein $t_a$ is a time in the azimuth direction, to obtain de-ramped data; and (3.20) transforming the de-ramped data, via long azimuth FFTs, into the image data.

2. The use of a method according to claim 1 for two-dimensional processing of SONAR and seismic raw data with the stripmap, spotlight and hybrid modes.

* * * * *